Jan. 6, 1948.    G. KLUMPP    2,434,166
ELECTRIC COOKER
Filed June 19, 1945
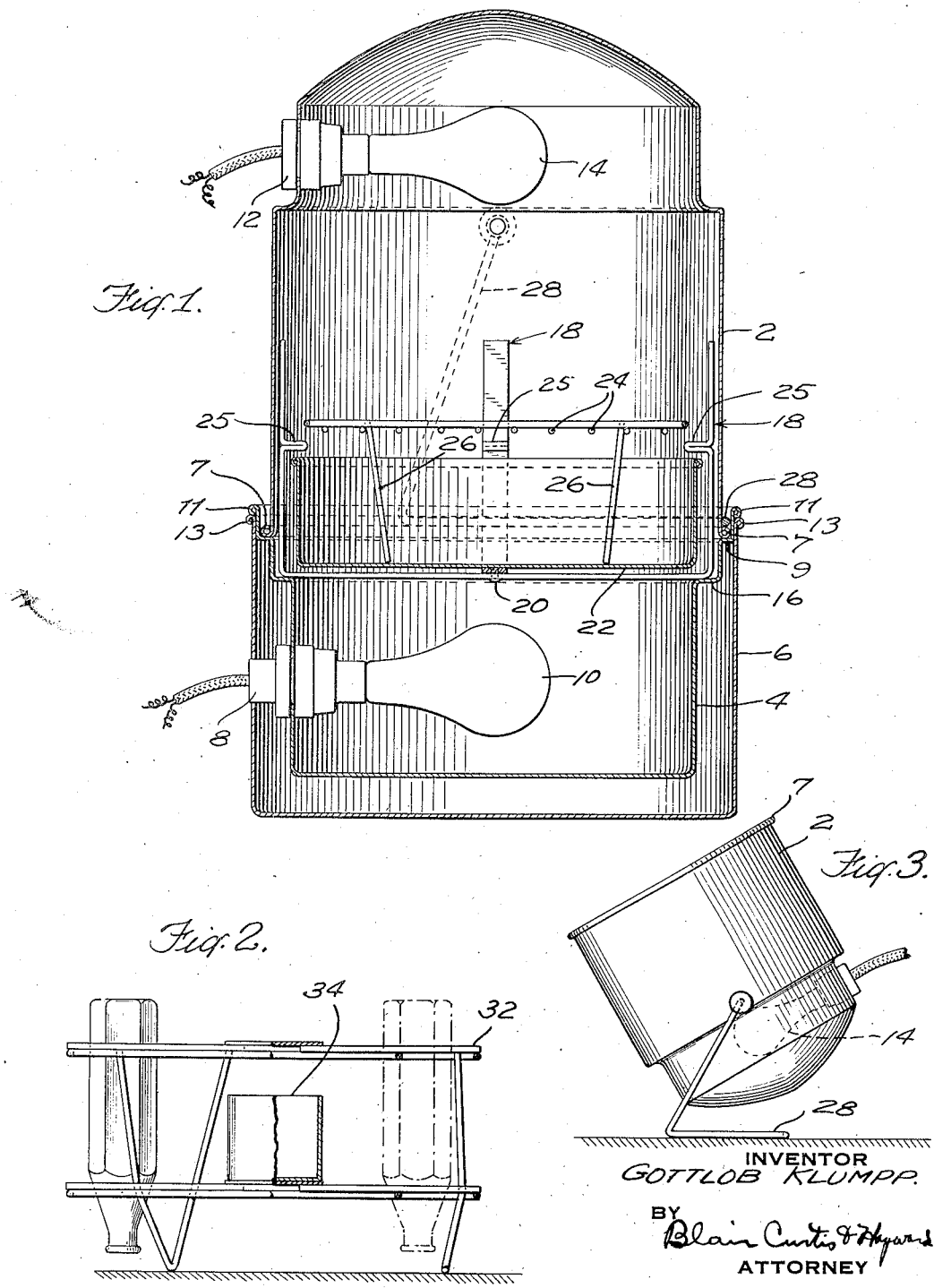
INVENTOR
GOTTLOB KLUMPP.
BY
Blair Curtis & Hyard
ATTORNEY Patented Jan. 6, 1948

2,434,166

UNITED STATES PATENT OFFICE 2,434,166

ELECTRIC COOKER

Gottlob Klumpp, Bronx, N. Y.

Application June 19, 1945, Serial No. 600,285

3 Claims. (Cl. 219—35)

This invention relates to electric cooking and the like and is particularly concerned with an improved cooker using electric light bulbs as the heating elements and operating mainly by radiant heat.

An object of this invention is to provide a simple and efficient and thoroughly safe and dependable apparatus for cooking with electricity. A further object is to provide for the efficient use of heat in baking, broiling and related cooking processes. A further object is to provide a sturdy and efficient heat device which uses electric light bulbs as the heating or radiating elements. These and other objects will be in part obvious and in part pointed out below.

The invention accordingly consists in the features of construction, combinations of elements, and arrangements of parts as will be exemplified in the structure to be hereinafter described and the scope of the application of which will be indicated in the following claims.

In the drawing:

Figure 1 is a vertical section of one embodiment of the invention;

Figure 2 is a side elevation partly in section showing a rack which may be a part of the embodiment of Figure 1; and, Figure 3 is a side elevation of the upper shell and heating unit of that embodiment.

As compared with flame heating apparatus, electric heaters are extremely efficient in the consumption of energy. Some electric heaters have high-temperatured resistance heating elements certain of which are of the hot-wire type and others of which are of the hot-plate or hot-rod type. Still other such heating devices use a conducting liquid such as water as the resistance element so that the heat is produced within the liquid. Electric light bulbs have also been used as heaters. The general theory of these heaters has been to heat insulate the entire zone around the heating element and then concentrate the heating effect at one point bringing the material to be heated as close to this point as possible.

The production of heat by a high-temperature element such as is used in the usual type of electric stoves often results in burning materials which are being cooked. On the other hand, when the temperature of the air surrounding the materials being cooked is raised by heat insulating the space, the apparatus has been heavy and bulky and expensive to manufacture. It is an object of the present invention to provide an electric cooker which is efficient and dependable in use, and which is light in weight and inexpensive to manufacture and operate.

In accordance with the present invention, the materials to be cooked are enclosed within a thin shell formed for example of metal such as sheet aluminum, the surfaces of which are highly polished and reflect heat and light rays. The cooking process may be of any type such as baking, broiling, boiling or frying; the single apparatus is thus adaptable to many uses.

Referring to Figure 1 of the drawing, a casing is formed by an upper shell 2 and a lower shell 4, the latter of which is enclosed within a base shell 6. Shell 2 has a bead 7 at its bottom edge which fits a seat 9 in an enlarged portion at the top of the lower shell 4. The upper edge of the lower shell is also provided with a bead 11 which rests upon a bead 13 on the top edge of the base shell 6. Mounted on the side wall of the lower shell 4 is a porcelain base 8 in which is mounted an electric light bulb 10. Bulb 10 is positioned with its center at the central vertical axis of shell 4 and has an envelope of glass of a low index of expansion. Similarly mounted near the top of upper shell 2 in a porcelain base 12 is an electric light bulb 14.

Lower shell 4 has an annular shoulder 16 near its upper edge upon which rests a cross-rack 18 formed by two U-shaped members riveted together by a single rivet 20 so that they may be hinged together and pivoted one with respect to the other. Cross-rack 18 carries a straight sided pan 22 and resting within this pan is a grill 24 having legs 26. A bottom wall of shell 4 is flat, and due to the central position of bulb 10, the major portion of the heat from the bulb radiates directly onto the bottom of pan 22, or is reflected from the shell to the pan. The polished surfaces of the shell prevent any substantial dissipation of heat to the outside atmosphere, and the bottom shell 6 provides a heat-insulating chamber around the lower shell.

Upper shell 2 is also adapted to direct heat in an efficient manner toward the pan and its polished surfaces prevent appreciable dissipation of heat. The top wall of shell 2 is curved to provide a reflector, and the top of the shell is of reduced diameter; thus, bulb 14 is centrally positioned within an efficient heat-radiating unit. When both bulbs are energized, the heat produced beneath the pan heats the bottom of the pan while the heat produced by bulb 14 is directed against the food or other materials being cooked. Illustratively, bulb 14 is of the so-called "sun lamp"

type so that the cooking process is accompanied by beneficial treatment of the food.

Bulbs 10 and 14 are separately energized by time controlled switches (not shown) so that either or both may be energized for specified times. When it is desirable to perform a cooking process such as baking, both bulbs are energized for the desired period of time so that the heat is directed to the bottom of the pan as well as directly onto the food. For normal baking, grill 24 is removed, but food may be baked on the grill. Broiling is performed using bulb 14 only with the food supported by grill 24, and with pan 22 remaining relatively cool so that there is no burning of drippings. Boiling and frying may be with both bulbs or with bulb 10 only, the materials being placed directly in pan 22. When more than one container of materials is to be cooked at one time, rack 24 is removed and a second pan (not shown but like pan 22) is placed in rack 18 on ledges 25; in this event, both bulbs are energized so that the materials are cooked evenly. With all of these cooking processes the heating effect is of a nature and at such a rate that the materials being cooked are not burned. Furthermore, with this apparatus the foods are not dried out and they may be cooked without the addition of water.

Access may be had to the cooking space by merely lifting the upper shell away from the lower shell. The upper shell is provided with a supporting bracket 28 (see Figure 3) which is made of a length of wire bent into a curved bail and pivoted at its ends to the opposite sides of the shell. Bracket 28 may be swung to the position shown in Figure 3 to provide a rest for the upper shell or it may be swung to the nested position of Figure 1 wherein its base snugly fits the outer surface of shell 2. Pan 22 may be removed from rack 18 by pivoting the two rack members so that their sides are adjacent; that is, by hinging one around the other.

Special devices may be provided for use with or in place of pan 22. For example (see Figure 2), a bottle rack 32 may be provided which may replace grill 24 in pan 22. With bottle rack 32 in place and water in the bottom of the pan, bottles are positioned in the rack as indicated and sterilized by energizing bulb 14. A central cup 34 is fixed to rack 32 and may hold caps or the like to be sterilized. The upper shell may be used in the position shown in Figure 3 for general heating purposes such as for drying hair or as a sun lamp.

As many possible embodiments may be made of the above invention and as many changes might be made in the embodiment above set forth, it is to be understood that all matter hereinabove set forth, or shown in the accompanying drawing, is to be interpreted as illustrative and not in a limiting sense.

I claim:

1. In an electric cooker, the combination of, a substantially cylindrical lower shell having a flat bottom wall and having an axial length less than its diameter, a cylindrical upper shell of substantially the same diameter as said lower shell and having a beaded bottom edge telescoped within the top edge of said lower shell, said upper shell having a dome-like top wall connected to the main body of the shell by an annular shell portion of less diameter than the main body of the shell, a cross-frame supported by the upper portion of said lower shell, a pan supported by said cross-frame within said shells and positioned at the telescoped portions thereof, an electric light bulb positioned in the top portion of said upper shell and carried on the side wall thereof, a second electric light bulb positioned in said lower shell beneath said pan and supported on the side wall of the shell, a supporting shell enclosing said lower shell, and a bracket support for said upper shell comprising an elongated member pivoted at its ends to the opposite sides of the upper shell and having straight portions adjacent the pivots and a curved portion at its center with the curved portion being of a curvature to extend more than half-way around said upper shell.

2. Apparatus as described in claim 1, wherein said supporting shell has a flat bottom and provides a heat insulating space substantially around said lower shell.

3. In an electric cooker, the combination of, a substantially cylindrical lower shell of highly polished sheet aluminum having a flat bottom wall and having an axial length less than its diameter, a cylindrical upper shell of highly polished sheet aluminum of substantially the same diameter as said lower shell and of substantially greater axial length, said upper and lower shells having telescoping ends providing support for said upper shell, said upper shell having a dome-like top wall connected to the main body of the shell by an annular shell portion, a cross-frame supported by the upper portion of said lower shell and adapted to support a pan or the like positioned at the telescoped portions of the shells, an electric light bulb positioned in the top of said upper shell and carried by the wall thereof, a second electric light bulb positioned in said lower shell beneath said cross frame and carried by said lower shell, a supporting shell enclosing said lower shell and providing a free space therearound whereby said lower shell is insulated, and a bracket support carried by said upper shell and providing for the support of said upper shell when said upper shell is removed from said lower shell.

GOTTLOB KLUMPP.

REFERENCES CITED

The following references are of record in the file of this patent:

UNITED STATES PATENTS

| Number | Name | Date |
| --- | --- | --- |
| 1,630,237 | Smith | May 24, 1927 |
| 1,673,333 | Klumpp | June 12, 1928 |
| 1,969,614 | Klopfenstein | Aug. 7, 1934 |
| 2,291,359 | Uhlrig et al. | July 28, 1942 |